(12) United States Patent
McCrumb

(10) Patent No.: US 6,378,924 B1
(45) Date of Patent: Apr. 30, 2002

(54) REUSABLE BOTTLE HOLDER

(76) Inventor: Dennis L. McCrumb, 11851 W. Andre, Grand Ledge, MI (US) 48837

( * ) Notice: Subject to any disclaimer, the term of this patent is extended or adjusted under 35 U.S.C. 154(b) by 0 days.

(21) Appl. No.: 09/698,414

(22) Filed: Oct. 30, 2000

(51) Int. Cl.7 .............................................. B65D 23/10
(52) U.S. Cl. ...................... 294/28; 215/396; 294/31.2; 294/32
(58) Field of Search ........................... 294/27.1, 28, 29, 294/31.1, 31.2, 34, 32, 33; 215/395, 396, 397; 220/465.1, 466, 467, 475; 222/465.1

(56) References Cited

U.S. PATENT DOCUMENTS

| | | | | |
|---|---|---|---|---|
| 2,225,891 A | * | 12/1940 | Sprung | 294/31.2 |
| 2,782,064 A | * | 2/1957 | Montgomery | 294/31.2 |
| 2,807,399 A | * | 9/1957 | Burns | 294/32 |
| 2,875,933 A | * | 3/1959 | Nelson | 294/32 |
| 3,021,026 A | * | 2/1962 | Clare | 294/27.1 X |
| 3,373,897 A | * | 3/1968 | Haines | 294/32 X |
| 4,339,032 A | | 7/1982 | Wood | |
| 4,379,578 A | | 4/1983 | Schuler | |
| 4,399,668 A | * | 8/1983 | Williamson | 294/31.2 X |
| 4,511,167 A | * | 4/1985 | Kawaguchi | 294/28 |
| 4,627,554 A | | 12/1986 | Leibinsohn | |
| 4,660,876 A | | 4/1987 | Weldin et al. | |
| 4,733,794 A | | 3/1988 | Kent | |
| 4,768,403 A | | 9/1988 | Bar-Noy | |
| 4,773,549 A | | 9/1988 | Avraham | |
| 4,796,937 A | * | 1/1989 | Andrea | 294/31.2 |
| 4,821,372 A | | 4/1989 | Casiello | |
| 4,865,208 A | | 9/1989 | Lax | |
| 4,896,913 A | | 1/1990 | Kennedy | |
| 5,104,010 A | | 4/1992 | Codorniz | |
| 5,183,169 A | | 2/1993 | Grzych | |
| 5,277,467 A | * | 1/1994 | Hepworth et al. | 294/31.2 |
| 5,487,482 A | | 1/1996 | Rocheleau | |
| 5,653,124 A | | 8/1997 | Weber | |
| 5,988,464 A | | 11/1999 | Butler et al. | |
| 6,019,335 A | | 2/2000 | Sehati | |
| 6,041,952 A | | 5/2000 | Martin | |
| 6,105,831 A | | 8/2000 | Finezilber | |

FOREIGN PATENT DOCUMENTS

| | | | | |
|---|---|---|---|---|
| CA | 659794 | * | 3/1963 | 294/31.2 |
| GB | 707009 | * | 4/1954 | 294/27.1 |
| GB | 1341481 | * | 12/1973 | 294/31.2 |

* cited by examiner

*Primary Examiner*—Johnny D. Cherry
(74) *Attorney, Agent, or Firm*—John M. Naber

(57) ABSTRACT

A reusable, releasable, bottle holder device is disclosed and adapted for use with bottles now commonly used. The device has a pair of rigid semi-annular plates hingedly mounted to each other along one edge. Each of the rigid plates is pre-formed with a curve which is concave from the other to receive a bottle. The device includes a first and second handle half attached to a second edge of each of the semi-annular plate edges and having at least one pin in a second handle half situated to co-operably engage with a ring opening in a first handle half in a closed position, the pin having a flexible and deformable cap. The device can be made out of clear materials allowing easy identification of the contents. When the curved rigid plates are in an open position, they are stackable allowing for space efficient transport and display.

1 Claim, 2 Drawing Sheets

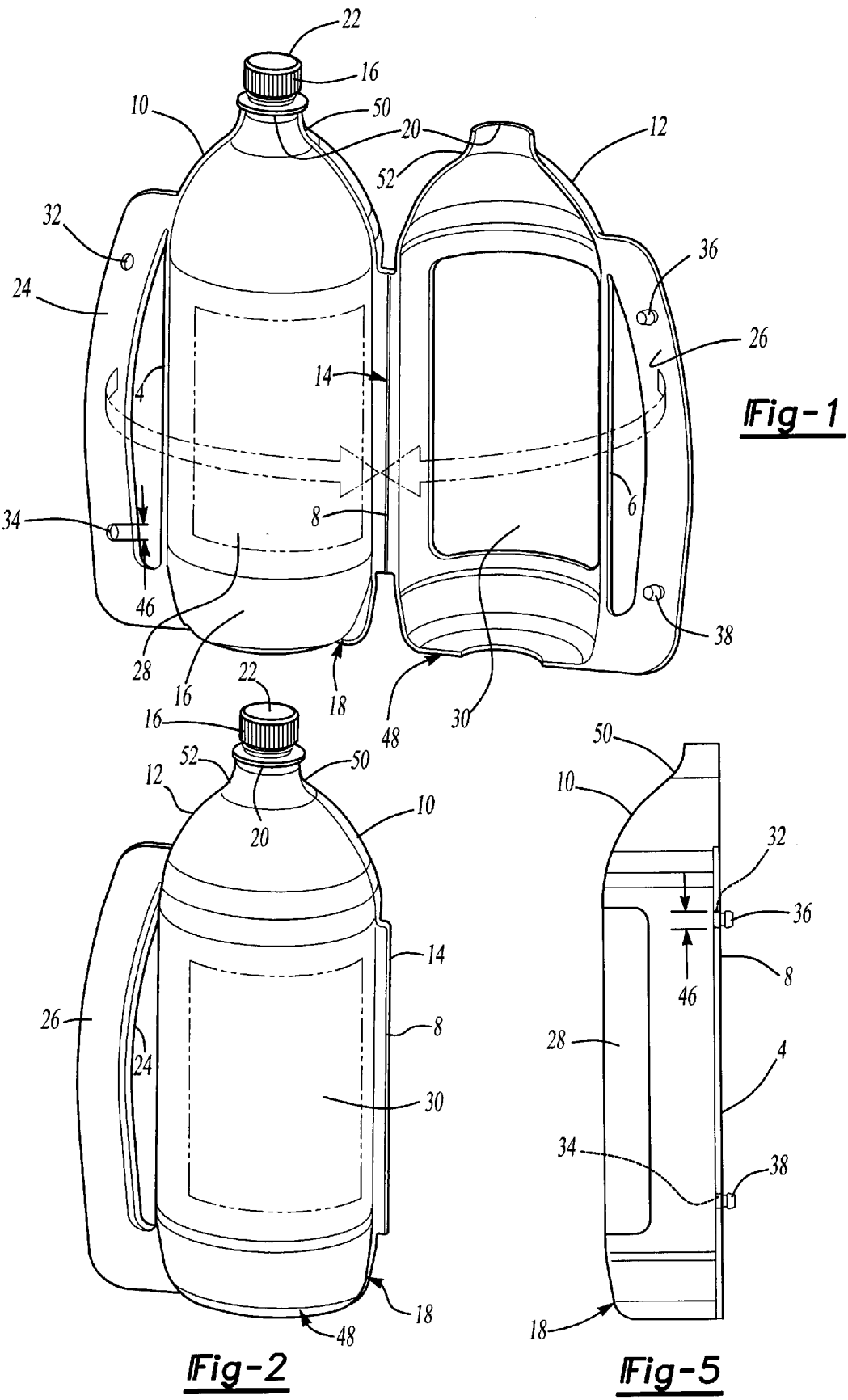

REUSABLE BOTTLE HOLDER

BACKGROUND OF THE INVENTION

1. Field of the Invention

The invention relates generally to reusable holders for fluid containers and particularly to a reusable bottle holder specifically designed for conventional large soft drink bottles.

2. Description of the Prior Art

Many bottles are currently manufactured of relatively flexible plastic such as P.E.T. (polyethylene terephthalate). These bottles are relatively rigid and shape maintaining and the contents of these bottles can be fully stored within the bottle even under mild pressure. Unfortunately, as the contents of many bottles are emptied and replaced by air, particularly the popular two liter bottle, they become easily deformable and thus make grasping difficult. In fact, this deformation may increase to such a degree that such bottles can slip from the grasp of the user, thus causing the spilling of the remainder of the contents and other like inconveniences.

Some bottle holders are known in the prior art (See generally, U.S. Pat. Nos. 5,183,169; 4,896,913; 4,865,208; 4,821,372; 4,773,549; and 4,627,554). These holders and other similar holders support bottles from their necks, and thus require some sort of handle. Bottom supporting types of bottle holders have the disadvantage in that the weight of the liquid contents of a bottle tend to move towards the top of the bottle during pouring operation. This can dislodge the bottom of the bottle from the holder.

Likewise, other problems exist with prior art bottle holders. Most hold only a small portion of the bottle and can slip and disengage while in use, thereby defeating their entire purpose. Others are complicated and if installed improperly can also disengage while in use. Some bottle holders are bulky and do not lend themselves to easy stackability for transport to or display in retail stores. Still others can obscure much of the labeling on the bottle being held leading to possible confusion or improper product identification by the consumer. And finally, these prior art bottle holders do nothing to maintain a constant temperature of the fluid within the bottle.

SUMMARY OF THE INVENTION

Accordingly, the present invention provides a device to hold a bottle or other fluid container that addresses all the shortcomings of the prior art bottle holders.

An object of the present invention is a device to assist in dispensing liquids from a container, comprising a pair of curved rigid plates hingedly mounted to each other along one edge permitting them to be pivoted to an open position or to a closed position; each of the pair of rigid plates being pre-formed with a curve substantially following the arc of a circle with a bottom that forms a bottom edge and a top that forms an annular neck flange; and a retainer device on a second edge of the curved rigid plates for releasably retaining said pair of rigid plates in their closed position, whereby a substantially continuous contact to the container for dispensing the liquid therefrom results.

It is another object of the present invention to provide a bottle holding device that has a handle that provides an additional device to grasp and close the bottle holder.

It is another object of the present invention to provide a bottle holding device that is substantially clear, whereby the consumer is able to see a content label of the fluid contained.

It is another object of the present invention to provide a bottle holding device that is stackable in its open position, whereby the device can be efficiently transported to retail stores.

It is another object of the present invention to provide a bottle holding device that uses a simple design that is easy to manufacture.

It is another object of the present invention to provide a bottle holding device that allows fluid container bottles to be made of thinner walls or more flexible walls allowing economy and reduction of resources for fluid containers.

It is another object of the present invention to provide a bottle holding device that has insulative qualities, whereby a more constant fluid temperature is maintained.

Other objects of the present invention will become more apparent to persons having ordinary skill in the art to which the present invention pertains from the following description taken in conjunction with the accompanying figures.

BRIEF DESCRIPTION OF THE FIGURES

The foregoing objects, advantages, and features, as well as other objects and advantages, will become apparent with reference to the description and figures below, in which like numerals represent like elements and in which:

FIG. 1 is an overall perspective view illustrating one form of the reusable bottle holder according to the present invention in its open position with a bottle in place.

FIG. 2 is an overall perspective view illustrating one form of the reusable bottle holder according to the present invention in its closed position with a bottle in place.

FIG. 5 is an end view of the form of the reusable bottle holder according to the present invention in the open position.

DETAILED DESCRIPTION OF THE PREFERRED EMBODIMENT

The present invention generally relates to a reusable device to hold a fluid container. One specific purpose for the bottle support of the present invention is suitable as a soda bottle holder for one, two, and three liter P.E.T. soda bottles. The invention provides a consumer with a device that can be properly sized to receive any bottle of the above-noted type. The invention is, however, not limited to soda bottles of the above indicated type since, as will be seen, the invention is readily adaptable to various types of bottles and other containers without departing from the scope of the invention.

When applied, the bottle support of the present invention will facilitate one-hand lifting of a bottle and the pouring out of its contents. The structure of the invention provides excellent handling control and, moreover, the structure of the invention will be reusable and very durable. The product may be injection molded with F.D.A. approved polypropylene or polystyrene plastic resin. It can have a layer of insulative material. A variety of colors and finishes may be employed. Further, the device can be substantially clear. Other types of materials to meet the objects of the present invention are possible, though.

The structure of the invention permits bulk stacking with the holders of the invention being readily nestible one inside of the other for facilitating shelf storage and efficient transport to retail stores.

Figure 3:
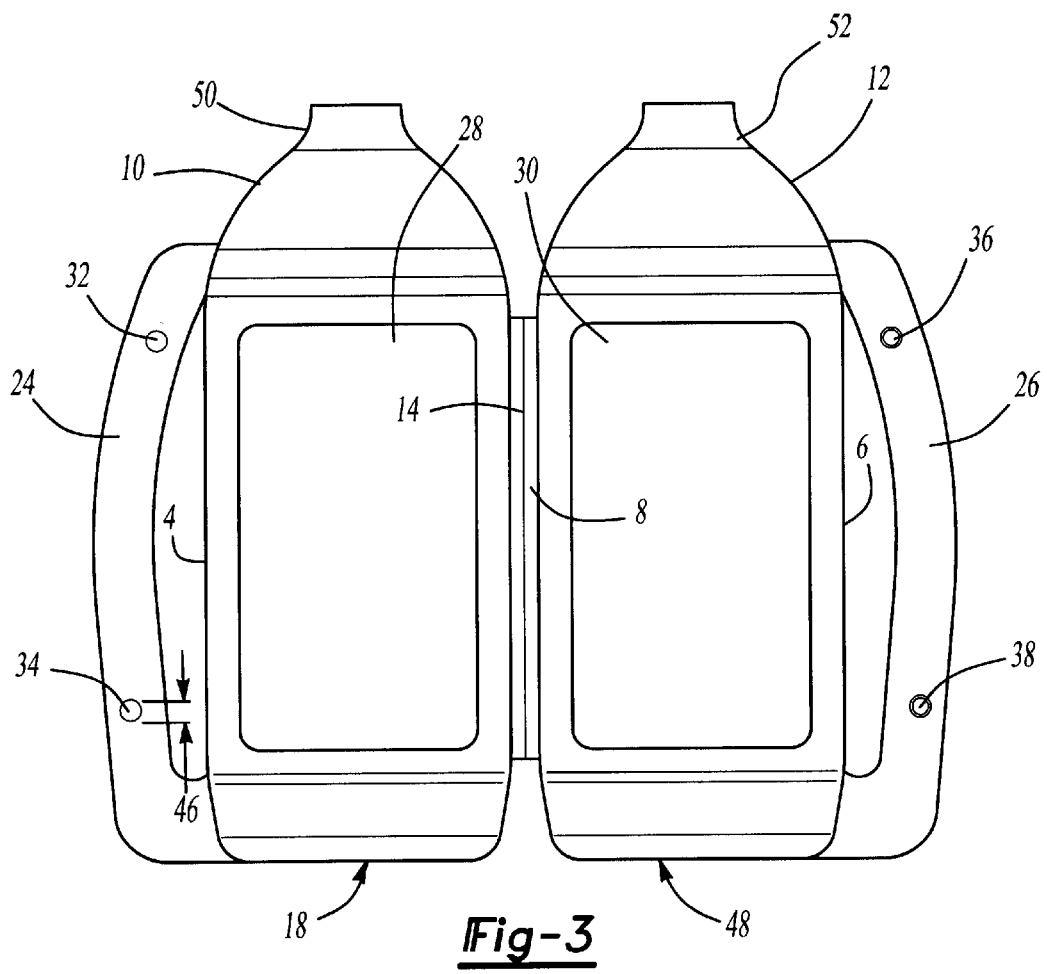
FIG. 3 is a side view of one form of the reusable bottle holder according to the present invention in the open position.
Figure 4:
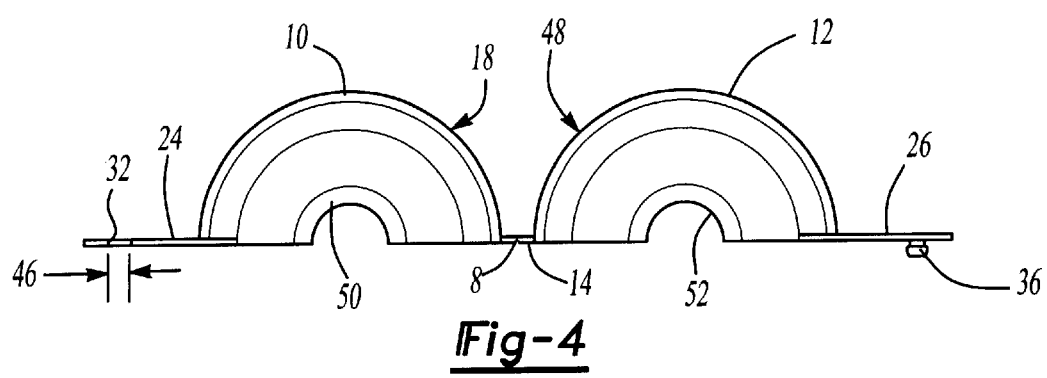
FIG. 4 is a top view of one form of the reusable bottle holder according to the present invention in the open position.

The assembly illustrated in the drawings comprises two curved rigid plates 10, 12 hingedly mounted to each other along their inner edges 8, 14 to permit them to pivot to an open position, as shown in FIG. 1, or to a closed position as shown in FIG. 2. Other views of the device in the open position are shown in FIGS. 3, 4 and 5. In the closed position, curved rigid plates 10 and 12 define a cavity for receiving a bottle 16 have a bottle top 22. Each of the two curved rigid plates 10, 12 is pre-formed with a curve substantially following an arc of a circle with bottoms 18, 48 that form a bottom edge and tops 50, 52 that form an open annular neck flange 20 in the closed position. Each of the two curved rigid plates, 10, 12 also has outer edges 4, 6 and in the preferred embodiment transparent windows 28, 30. The arrangement is such that when the bottle 16 is received within the two curved rigid plates 10, 12; and, the two curved rigid plates 10, 12 are pivoted to their closed position as shown in FIG. 2, they retain, support and hold the bottle while exposing the bottle top 22 and bottle label through transparent windows 28, 30.

Figure 6:
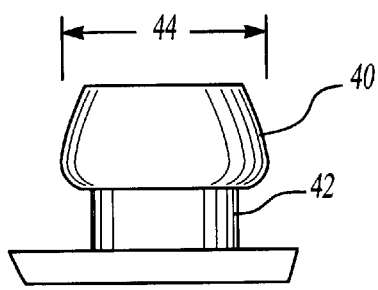
FIG. 6 is a detailed view of a retainer device pin.

The two curved rigid plates 10, 12 are retained in their closed position by a retainer device. Several types of retaining devices are possible. In the preferred embodiment, the retainer device includes a first handle half 24 and a second handle half 26 attached to outer edges 6, 8 respectively. The retainer elements further include rings 32, 34 with a ring diameter 46 that define openings in first handle half 24. Pins 36 and 38 are fixed to the second handle half 26, and are co-operably engaged with rings 32 and 34 respectively in the closed position. Pins 32 and 34 are further illustrated in FIG. 6 showing a flexible cap 40 having a cap diameter 44 and a stem 42. The flexible cap diameter 44 is slightly greater than the ring diameter 46 so that when the pins 36 and 38 are forced through the rings 32 and 34 respectively, the flexible cap 40 retains the closed position until forced open by the consumer. The risk of the caps 36 and 38 disengaging from rings 32 and 34 while fluid from the bottle 16 is poured is further minimized if the user is grasping the handle.

The above-described embodiment of the invention is therefore to be considered purely for purposes of example, it being appreciated that many other variations, modifications, and applications of the invention may be made.

I claim:

1. A device to assist dispensing liquids from a container, comprising:

a first and second curved rigid plate hingedly mounted to each other along an inner edge permitting them to be pivoted to an open position or to a closed position;

each of the first and second curved rigid plates being pre-formed with a curve substantially following an arc of a circle in the closed position with a bottom that forms a bottom edge and a top that forms an annular neck flange;

a retainer device on an outer edge of the first and second curved rigid plates for releasably retaining the curved rigid plates in their closed position, whereby a substantially continuous contact to the container for dispensing the liquid therefrom results;

the retainer device comprising a first handle half and second handle half attached to the outer edges of the first and second curved rigid plates respectively, whereby no unexpected release of the curved rigid plates is ensured; and the retainer device further comprising at least one ring with a ring diameter that defines an opening in the first handle half, and at least one pin in the second handle half situated to co-operable engage with the ring opening in the closed position, the pin having a flexible and deformable cap with a cap diameter and a stem, the flexible cap diameter being slightly greater than the ring opening diameter so that when the pin is forced through the ring opening the flexible cap reforms and releasably retains the first and second curved rigid plates in the closed position.

* * * * *